United States Patent [19]

Bowman et al.

[11] 3,830,541

[45] Aug. 20, 1974

[54] EXPANDABLE TRAVEL TRAILER
[76] Inventors: Jerry D. Bowman; William V. Bowman, both of 1310 N. Dukane, Indianapolis, Ind. 46241
[22] Filed: Dec. 26, 1972
[21] Appl. No.: 318,495

[52] U.S. Cl.................. 296/27, 296/23 R, 52/64
[51] Int. Cl............................................. B60p 3/34
[58] Field of Search ........ 296/23 MC, 23 R, 26, 27; 52/64, 65, 66, 67

[56] References Cited
UNITED STATES PATENTS 3,168,343  2/1965  Marcel................................ 296/27
3,429,609  2/1969  Robb................................ 296/27 X
3,608,953  9/1971  Bernard.............................. 296/27

Primary Examiner—Philip Goodman
Attorney, Agent, or Firm—Robert A. Spray

[57] ABSTRACT

A travel trailer convertible from a low-silhouette road-travel condition and an upraised and longitudinally-extended condition, by rotational raising movement of a frame section rearwardly and upwardly, with a corresponding raising of a movable roof section.

8 Claims, 5 Drawing Figures

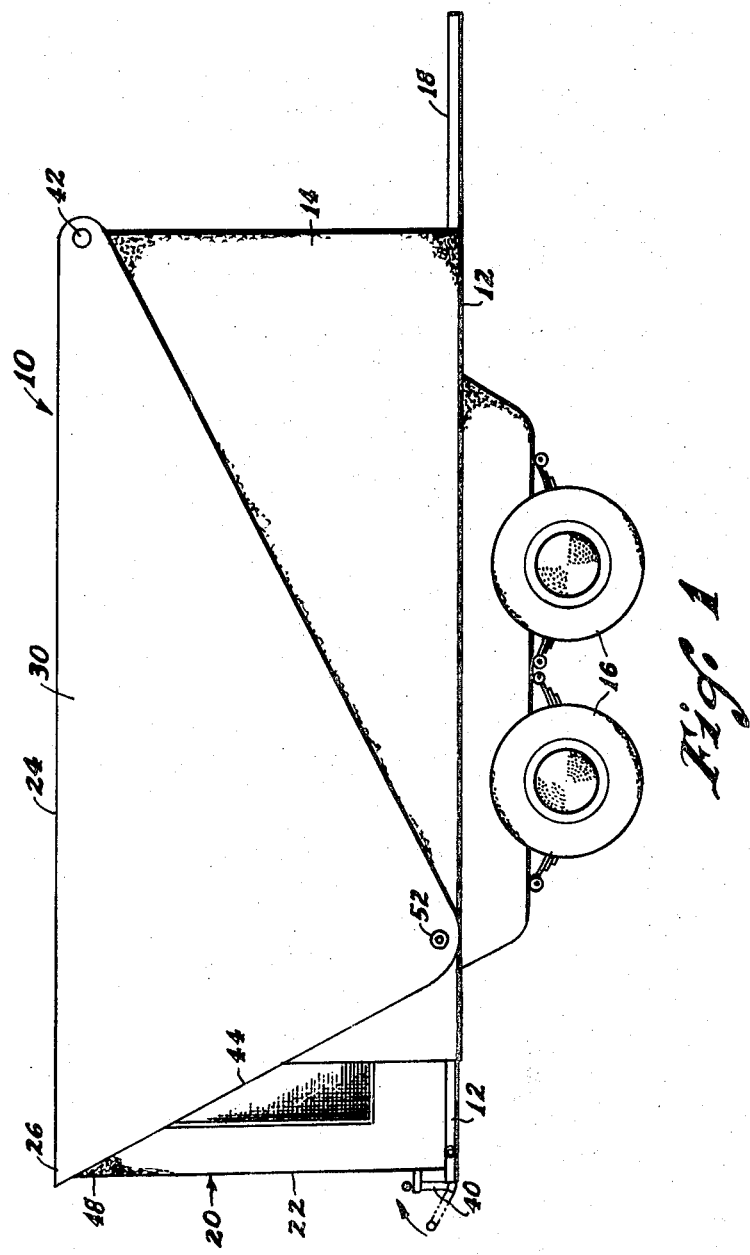

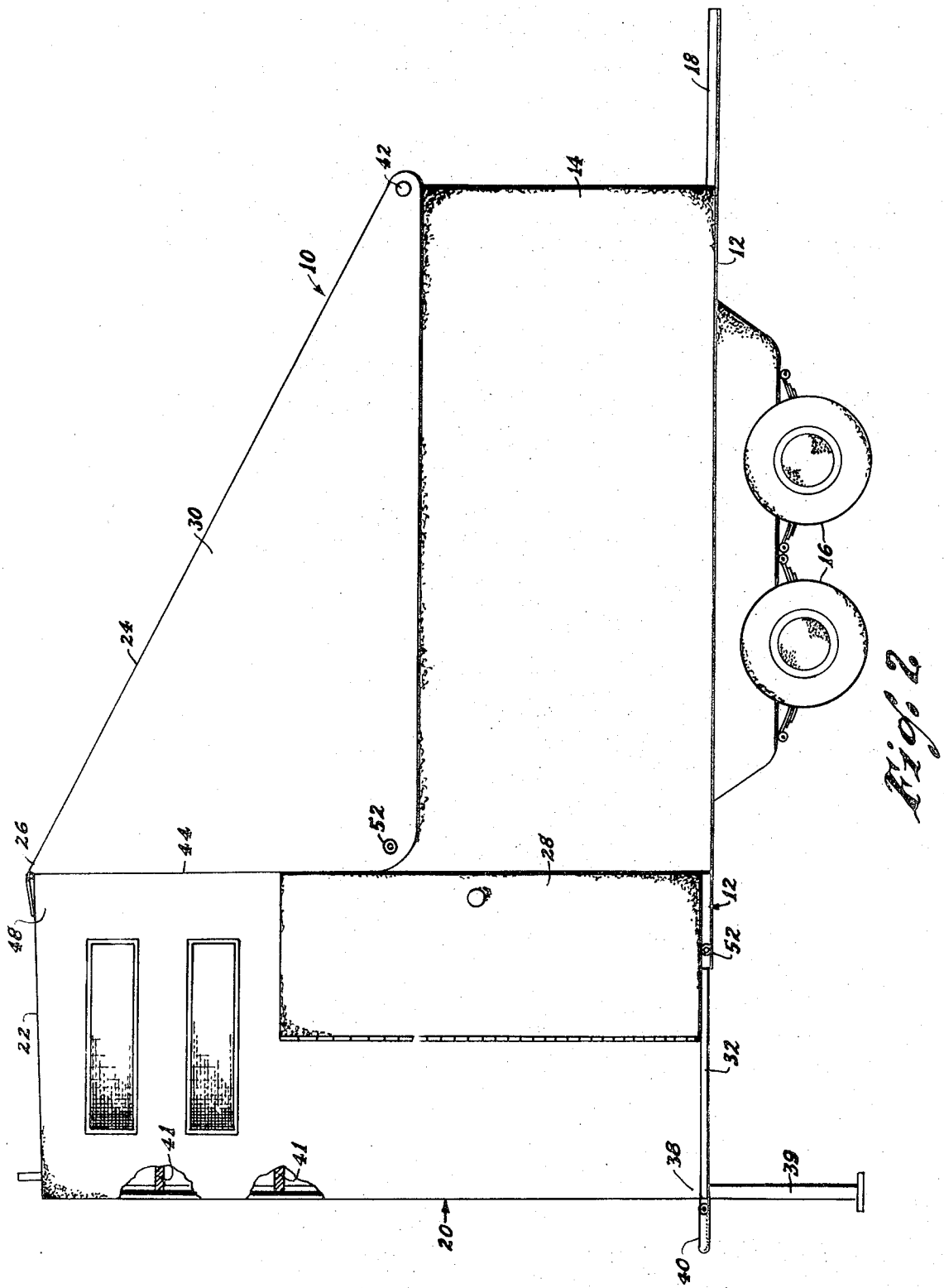

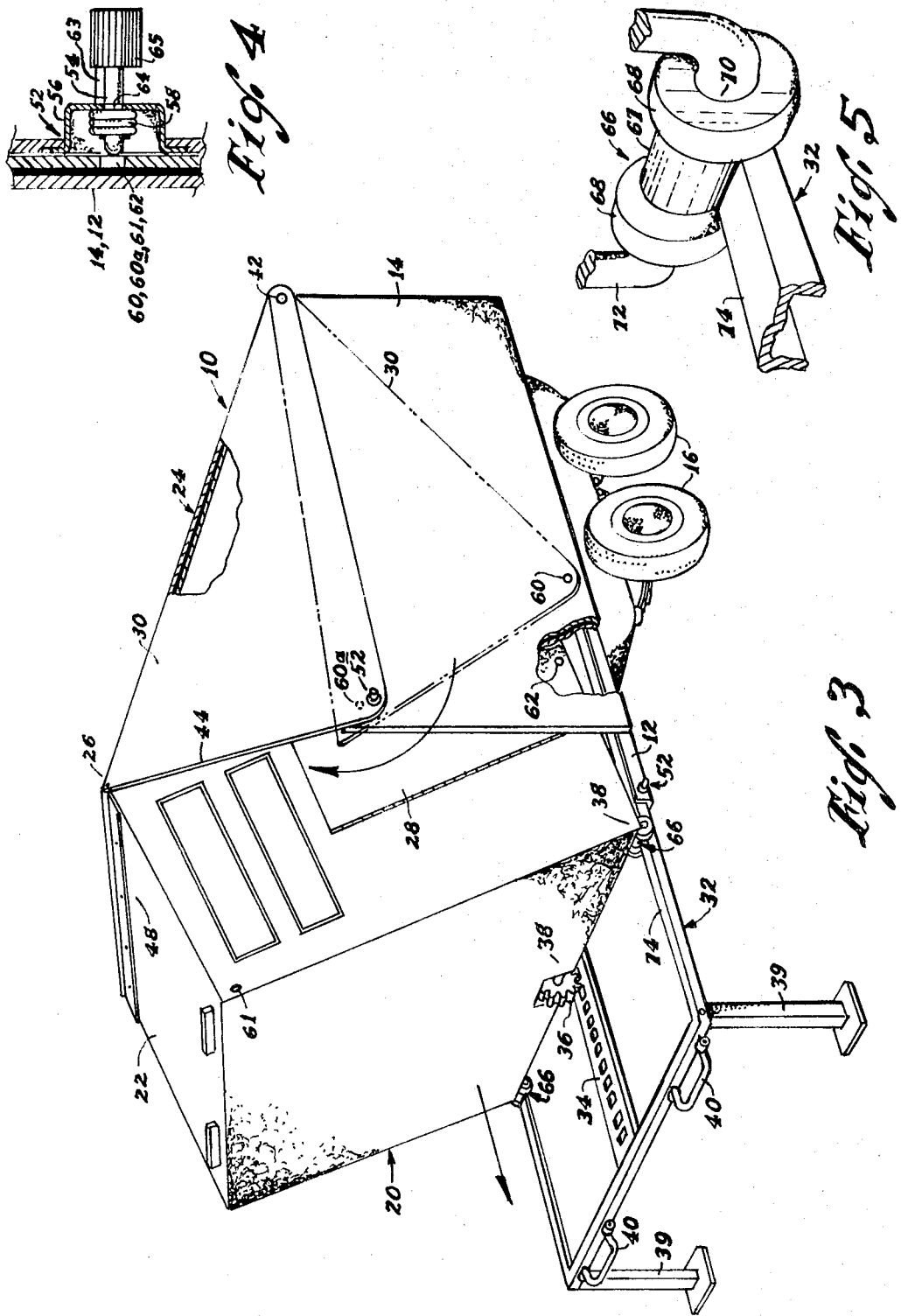

EXPANDABLE TRAVEL TRAILER

This invention relates to travel trailers, and more particularly relates to novel concepts of adaptability of a travel trailer between a compact or retracted low-silhouette condition for roadway travel, and an upraised and longitudinally-extended condition for its habitation use.

The respective advantages of trailer-convertibility, between a compacted road-travel condition and an erected or upraised enlarged condition, are deemed quite obvious; and thus the convertibility will not be here detailed except as background in understanding the inventive concepts. However, it should expressly be realized that the present concepts provide not only that convertibility but that overall advantage in a combination which provides also both convenience of the convertibility and adequately high weather-tightness of the trailer in either of its compacted or extended conditions.

In carrying out the invention in a preferred embodiment, the trailer's bed and door assembly is provided as a movable compartment or frame means, and it is supported for movement between a generally horizontal position in the retracted condition of the trailer, and a generally vertical position in the expanded condition of the trailer. Moreover, the support is such that the movable frame means in the expanded trailer-condition is positioned relatively outwardly of the trailer's base, in comparison to its position when the trailer is in its retracted condition. Thus, in the expanded condition, the trailer is both longer and higher than its retracted condition.

Further, the adaption or conversion means also includes a movable roof panel means, which in the retracted condition of the trailer is supported in a retracted generally horizontal position in which it generally wholly overlies the movable compartment when it is in its generally horizontal position, and which in the expanded condition of the trailer is supported in a second position in which its end portion adjacent the movable frame means is raised to generally the height thereof when it is in its generally vertical position.

Thus, the advantages of roadway compactness yet habitation expansion of the trailer are advantageously achieved.

The above description is of introductory and generalized nature. More particular details, concepts, features and advantages are set forth in the following, more detailed description of an embodiment illustrative of the inventive concepts, taken in conjunction with the accompanying somewhat diagrammatic drawings, in which:

FIG. 1 is a side elevational view of a travel trailer having adaptation or conversion means according to the inventive concepts, the trailer being shown in its compact or retracted condition;

FIG. 2 is a similar side elevational view of the travel trailer, but shown in its upraised or expanded condition, providing an expanded height and extended fore-and-aft dimension of the trailer;

FIG. 3 is a pictorial view of the travel trailer in an intermediate position, portions shown as broken away to indicate details otherwise concealed;

FIG. 4 is an enlarged detail view of a holding pin means, in cross-sectional view; an FIG. 5 is an enlarged detail view of a movable support means which provides movable support of the movable conversion compartment of the trailer.

As shown in the drawings, a travel trailer 10 is provided with a stationary base 12, a front panel, and side panels 14 extending upwardly from the base 12. The side panels 14 are shown of stationary form. Wheels 16 and a pulling tongue or draw bar 18 are also shown.

According to the inventive concepts, the travel trailer 10 is characterized by adaption or conversion means providing selective convertibility of the trailer in and between a retracted condition (FIG. 1) and an expanded condition (FIG. 2). That is, the retracted condition provides a relatively low overall height or silhouette of the trailer, as for roadway use; an the expanded condition of the trailer provides an upraised and extended condition providing a relatively higher height and longer length, as for habitation use.

As shown, the adaption means including a movable frame means 20, and support means supports the frame means 20 for movement between a generally horizontal position (FIG. 1) in the retracted trailer-condition and a generally vertical position (FIG. 2) in the expanded condition of the trailer. The support is such that the movable frame means 20, when in expanded-trailer condition, is positioned relatively outwardly of the stationary base 12 in comparison to its position in the retracted trailer condition, thus making the expanded trailer condition longer as well as higher than its retracted condition. It will be noted that the movable frame means 20 includes an end panel means 22 which in the generally horizontal frame position is generally vertical, and which in the generally vertical frame position is generally horizontal. In the former, it provides an end panel of the trailer, and in the latter, it provides a portion of the trailer roof.

The adaption means also includes a movable roof panel means 24 which in the retracted condition of the trailer is supported in a retracted generally horizontal position in which it generally wholly overlies the movable frame means 20 (when it is in its generally horizontal position), and which in the expanded condition of the trailer is supported in a second position in which its end portion 26 which is adjacent the movable frame means 20 is raised to generally the height thereof when that frame means 20 is in its said generally vertical position.

One of the components in the movable conversion frame or compartment 20 is an access door 28 for the trailer. It will be noted, FIG. 2, that the door 28 is vertical when the frame means 20 is in its said generally vertical position, although it is on its side when the frame means 20 is in its horizontal position of FIG. 1.

Movable side panel means 30 extend generally downwardly from opposite sides of the said movable roof panel means 24. The aforesaid stationary side panel means 14 enclose the movable frame means 20 when in its generally horizontal position, and the movable side panel means 30 then outwardly overlie those other side panel means 14, the movable roof panel means 24 being then in retracted position; but the movable side panel means 30 provide a side enclosure of said trailer when the trailer is in its expanded condition (FIG. 2) with the movable roof panel means in its said raised position.

FIG. 3 shows a movable support means 32, which in the retracted condition of the trailer is relatively inwardly of the trailer generally within the longitudinal span of the stationary base 12 thereof, and which, in the process of converting said trailer into its expanded condition is adapted to be moved longitudinally rearwardly to a relatively outward and rearward position with respect to the stationary base 12 and provides support of the movable frame means 20 when in its generally vertical position of FIG. 2.

FIG. 3 further shows that in this embodiment the movable support means 32 includes a rack means 34 and an associated pinion means 36 mounted on a laterally extending horizontal axis adjacent the portion 38 of the frame means 20 which is at its lower and relatively inward position when the frame means 20 is in its generally horizontal position of retracted trailer condition but at its lower and relatively outward or rearward position when the frame means 20 is in its generally vertical position of expanded trailer condition.

The movable support 32 also is shown as having pivotal legs 39 which are ground-engageable, and the support 32 is manipulated between its retracted and extended positions by handles 40 which are shown (FIG. 1) as itself retractable to an upright position as may be desired during towing.

A further advantage of the illustrated embodiment is that the movable frame means 20 includes a bed compartment, as noted by bed frames 41 (FIG. 2). This provides a further advantage, of the trailer's interior components, which are relatively light and relatively unharmed by the 90° conversion rotation, being the trailer components which are built into the movable compartment frame 20.

The aforesaid movable side panel means 30 are of a generally triangular form. The corner thereof which is remote from the upraised movable frame means 20 is operatively pivoted to the said trailer as at 42; and the edge 44 of each panel 30 remote from that corner 42 is of a length operatively sufficient to accommodate the difference in trailer height between its retracted condition and its expanded condition. Thus the panels 30 provide side panels for the upper portions of the trailer when it is in its expanded condition.

A watertight means 46 (FIG. 3), of relatively movable nature, interconnects the edge 26 of said roof panel means which is adjacent the vertically positioned movable frame means 20 and the portion 48 of the frame means 20 which is at its upper and relatively outward position (when said frame means is in its generally horizontal position of retracted trailer condition) but at its upper and relatively inward position when said frame means 20 is in its generally vertical position of expanded trailer condition.

With further reference to the movable compartment's end panel 22 and its adjacent panel 50, it is noted that the end panel 22, in the retracted trailer condition, provides an end panel means of the trailer, and in the expanded trailer condition provides a roof panel means of the trailer; and, correspondingly, the second panel 50 which in the compact trailer is horizontal, in the expanded trailer condition it provides an end panel of the trailer generally in the plans of the end panel means provided by the panel 22 in the retracted trailer condition.

FIG. 4 illustrates one of the retainer pin means 52 which retain the components in desired position of adjustment. That is, a pin 54 which is held by a bracket 56 mounted respectively on side panels 30 and base 12 is spring-pressed (as by spring 58) inwardly. Thus, in the compact trailer condition, the pin 54 on panel 30 will retainingly engage or register into a receiver hole 60 in the lower portion of side wall 14, and a pin 54 on base 12 will register in a hole 61 on compartment 20 adjacent panel 22 but opposite edge 48; and, in the expanded trailer condition (as shown in FIG. 2), the pin 54 of panel 30 would register into a similar hole 60a in an upper portion of side wall 14 while the pin 54 of base 12 would register into a receiver hole 62 provided on the side face of the movable compartment 20 opposite corner 38 thereof.

It will be noted that the pin 54 is provided with an enlarged side-portion 63 which catches against the outer wall of bracket 56 to maintain the pin 54 in its withdrawn position; but, to effect engagement of the pin 54 with its associated receiver hole, the user will merely rotate the pin 54 to permit the side portion 63 pass through the opening 64 in the bracket wall 56. An operating knob for the pin 54 is shown at 65.

FIG. 5 illustrates a roller guide 66, having a roller 67 flanked by shoulders 68 and rotatably carried on a shaft 70 of a bracket 72 connected to the portion 38 of the movable compartment 20. The roller 67 rides on, and the shoulders 68 straddle, a longitudinal frame member 74 of the movable support frame 32, thus guiding, facilitating, and stabilizing the movement of the movable compartment 20 between the compacted and expanded trailer conditions.

It is thus seen that a convertible or expandable travel trailer according to the inventive concepts provides a desired and advantageous vehicle, providing conveniently and economically the dual and ordinarily non-compatible advantages of both shortness with low silhouette, in one condition, and height and extended length in another condition. No great manual effort or mechanical skill or know-how are required to achieve the conversion. The concepts lend themselves conveniently to a motorized mechanism, as by using the rack 34 and gear 36, and the supporting roller guides 66.

Accordingly, it will thus be seen from the foregoing description of the invention according to this illustrative embodiment, considered with the accompanying drawings, that the present invention provides a new and useful expandable travel-trailer having desired advantages and characteristics, and accomplishing its intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A travel trailer having a relatively stationary base;

characterized by adaption means providing selective convertibility of the trailer in and between
  a. a retracted condition providing a relatively low overall height or silhouette of the trailer, as for roadway use, and
  b. an expanded condition providing an upraised condition providing a relatively higher height, as for habitation use;
  said adaption means including a movable frame means (20) and support means supporting said frame means for movement between a generally horizontal position in said retracted condition and a generally vertical position in said expanded condition, the support being such that the movable frame means when in its expanded condition is positioned relatively outwardly of the stationary base in comparison to its position in the retracted trailer condition, thus making the expanded trailer condition both longer and higher than its retracted condition;

in a combination in which movable side panel means (30) extend generally downwardly from opposite sides of movable roof panel means (24), there being provided other side panel means (14) which enclose said movable frame means when in its generally horizontal position, and the said movable side panel means (30) outwardly overlying said other side panel means (14) when said movable roof panel means (24) is in its retracted position, but said movable side panel means (30) being supported so that it is movable to a location providing a side enclosure of said trailer when the trailer is in its expanded condition with said movable roof panel means (24) in its said raised position.

2. A travel trailer having a relatively stationary base;

characterized by adaption means providing selective convertibility of the trailer in and between
  a. a retracted condition providing a relatively low overall height or silhouette of the trailer, as for roadway use, and
  b. an expanded condition providing an upraised condition providing a relatively higher height, as for habitation use;
said adaption means including a movable frame means (20) and support means supporting said frame means for movement between a generally horizontal position in said retracted condition and a generally vertical position in said expanded condition, the support being such that the movable frame means when in its expanded condition is positioned relatively outwardly of the stationary base in comparison to its position in the retracted trailer condition, thus making the expanded trailer condition both longer and higher than its retracted condition;
in a combination in which a movable support means (32) is provided, which, in the retracted condition of the trailer is relatively inwardly of the trailer generally within the longitudinal span of the stationary base thereof, and which is itself supported so that in the process of converting said trailer into its said expanded condition, it is adapted to be moved longitudinally to a relatively outward position with respect to the said stationary base and thereby provides support of the said movable frame means (20) when in its generally vertical position.

3. The invention as set forth in claim 2 in a combination in which the said support means (32) includes a rack means (34) and the said movable frame means (20) includes an associated pinion means (36) mounted on a laterally extending horizontal axis adjacent the portion (38) of said frame means which is at its lower and relatively inward position when said frame means (20) is in its generally horizontal position of retracted trailer condition but at its lower and relatively outward position when said frame means (20) is in its generally vertical position of expanded trailer condition.

4. A travel trailer having a relatively stationary base;

characterized by adaption means providing selective convertibility of the trailer in and between
  a. a retracted condition providing a relatively low overall height or silhouette of the trailer, as for roadway use, and
  b. an expanded condition providing an upraised condition providing a relatively higher height, as for habitation use;
said adaption means including a movable frame means (20) and support means supporting said frame means for movement between a generally horizontal position in said retracted condition and a generally vertical position in said expanded condition, the support being such that the movable frame means when in its expanded condition is positioned relatively outwardly of the stationary base in comparison to its position in the retracted trailer condition, thus making the expanded trailer condition both longer and higher than its retracted condition;
in a combination in which the said movable frame means (20) includes a bed compartment.

5. The invention as set forth in claim 1 in a combination in which the said movable side panel means (30) are of a generally triangular form, the corner (42) thereof remote from the upraised movable frame means (20) being operatively pivoted to the said trailer, and the edge (44) thereof remote from said corner being of a length operatively sufficient to accommodate the difference in trailer height between its retracted condition and its expanded condition.

6. A travel trailer having a relatively stationary base;

characterized by adaption means providing selective convertibility of the trailer in and between
  a. a retracted condition providing a relatively low overall height or silhouette of the trailer, as for roadway use, and
  b. an expanded condition providing an upraised condition providing a relatively higher height, as for habitation use;
said adaption means including a movable frame means (20) and support means supporting said frame means for movement between a generally horizontal position in said retracted condition and a generally vertical position in said expanded condition, the support being such that the movable frame means when in its expanded condition is positioned relatively outwardly of the stationary base in comparison to its position in the retracted trailer condition, thus making the expanded trailer condition both longer and higher than its retracted condition;
in a combination in which relatively movable connection means interconnect the edge (26) of the roof panel means, which is adjacent the vertically positioned movable from means (20), and the portion (48) of the frame means which is at its upper and relatively outward position when said frame means (20) is in its generally horizontal position of retracted trailer condition but at its upper and relatively inward position when said frame means (20)

is in its generally vertical position of expanded trailer condition.

7. A travel trailer having a relatively stationary base; characterized by adaption means providing selective convertibility of the trailer in and between
   a. a retracted condition providing a relatively low overall height or silhouette of the trailer, as for roadway use, and
   b. an expanded condition providing an upraised condition providing a relatively higher height, as for habitation use;
said adaption means including a movable frame means (20) and support means supporting said frame means for movement between a generally horizontal position in said retracted condition and a generally vertical position in said expanded condition, the support being such that the movable frame means when in its expanded condition is positioned relatively outwardly of the stationary base in comparison to its position in the retracted trailer condition, thus making the expanded trailer condition both longer and higher than its retracted condition;
in a combination in which the said movable frame means (20) includes a first end panel means (22) which (a) in the retracted trailer condition provides an end panel means of the trailer, and which (b) in the expanded trailer condition provides a roof panel means of the trailer; and the said movable frame means (20) includes a second panel means which in the expanded trailer condition provides an end panel of the trailer generally in the plane of the end panel means provided by the said first panel means (22) in the retracted trailer condition.

8. A travel trailer having a relatively stationary base; characterized by adaption means providing selective convertibility of the trailer in and between
   a. a retracted condition providing a relatively low overall height or silhouette of the trailer, as for roadway use, and
   b. an expanded condition providing an upraised condition providing a relatively higher height, as for habitation use;
said adaption means including a movable frame means (20) and support means supporting said frame means for movement between a generally horizontal position in said retracted condition and a generally vertical position in said expanded condition, the support being such that the movable frame means when in its expanded condition is positioned relatively outwardly of the stationary base in comparison to its position in the retracted trailer condition, thus making the expanded trailer condition both longer and higher than its retracted condition;
the said support means providing that the movement of the movable frame means (20) between the retracted and expanded conditions of the trailer is a swinging movement in which the retracted-position vertical end panel thereof swings upwardly into a horizontal position and the retracted position horizontal bottom panel thereof both moves rearwardly and swings upwardly into a vertical position.

* * * * *

UNITED STATES PATENT OFFICE
CERTIFICATE OF CORRECTION

Patent No. 3,830,541　　　　Dated August 20, 1974

Inventor(s) Jerry D. Bowman et al.

It is certified that error appears in the above-identified patent and that said Letters Patent are hereby corrected as shown below:

Column 1, bottom line, "an" should read -- and --. Column 2, line 15, "an" should read -- and --. Column 3, line 21, "manipulated" should read -- manipulatable --. Column 6, line 64, "from" should read -- frame --.

Signed and sealed this 11th day of February 1975.

(SEAL)
Attest:

RUTH C. MASON
Attesting Officer

C. MARSHALL DANN
Commissioner of Patents
and Trademarks